(12) United States Patent
    Anderson et al.

(10) Patent No.: US 12,589,811 B2
(45) Date of Patent: Mar. 31, 2026

(54) VEHICLE HOOD RETENTION SYSTEM

(71) Applicant: Meyers Manx LLC, Costa Mesa, CA (US)

(72) Inventors: Ronald Lowell Anderson, Newport Beach, CA (US); Kory Kratz, Costa Mesa, CA (US); Joshua Dawson, Long Beach, CA (US); Freeman Thomas, Costa Mesa, CA (US); Alex Townley, Anaheim, CA (US)

(73) Assignee: Meyers Manx LLC, Costa Mesa, CA (US)

( * ) Notice: Subject to any disclaimer, the term of this patent is extended or adjusted under 35 U.S.C. 154(b) by 371 days.

(21) Appl. No.: 18/343,384

(22) Filed: Jun. 28, 2023

(65) Prior Publication Data

US 2025/0002090 A1    Jan. 2, 2025

(51) Int. Cl.
    *B62D 25/10* (2006.01)
    *B62D 25/12* (2006.01)

(52) U.S. Cl.
    CPC ............. *B62D 25/12* (2013.01); *B62D 25/10* (2013.01); *B62D 25/105* (2013.01)

(58) Field of Classification Search
    CPC ....... B62D 25/10; B62D 25/105; B62D 25/12
    USPC .................................... 296/193.11; D12/173
    See application file for complete search history.

(56) References Cited

U.S. PATENT DOCUMENTS

| | | | | |
|---|---|---|---|---|
| 2,606,625 A * | 8/1952 | Paton | ................... | B62D 25/105 |
| | | | | 292/225 |
| 2,856,228 A * | 10/1958 | Adell | .................... | B60R 13/043 |
| | | | | 296/193.11 |
| 3,730,582 A * | 5/1973 | Lieffring | .............. | B62D 25/087 |
| | | | | 296/193.11 |
| 6,722,731 B2 * | 4/2004 | Cornils | ...................... | B60J 1/02 |
| | | | | 296/146.15 |
| 7,789,179 B2 * | 9/2010 | Steiner | .................. | B29C 43/021 |
| | | | | 296/193.11 |
| 7,815,249 B2 * | 10/2010 | Seksaria | .............. | B62D 25/105 |
| | | | | 296/193.11 |
| 8,991,902 B2 * | 3/2015 | Wisniewski | ......... | B62D 25/105 |
| | | | | 296/193.11 |
| 9,896,134 B2 * | 2/2018 | Tsumiyama | ......... | B60Q 1/0408 |
| 10,144,456 B1 * | 12/2018 | Ciccone | .............. | B62D 25/082 |
| 10,471,998 B2 * | 11/2019 | Krijnen | ................ | B62D 29/043 |
| 10,773,572 B2 * | 9/2020 | Nakamura | ............... | B60J 10/50 |
| 11,628,888 B2 * | 4/2023 | Cote | ......................... | B60R 5/02 |
| | | | | 180/69.2 |
| 12,252,178 B2 * | 3/2025 | Cha | ....................... | B62D 29/043 |
| 2005/0001452 A1 * | 1/2005 | White | .................... | B62D 24/02 |
| | | | | 296/193.11 |
| 2011/0115259 A1 * | 5/2011 | Mizuta | .................. | B62D 25/14 |
| | | | | 296/193.11 |

(Continued)

*Primary Examiner* — Gregory A Blankenship

(57)    ABSTRACT

A vehicle hood retention system for a vehicle includes a hood panel having a top surface and side walls extending downwardly from the top surface and a nose at a forward most position of the hood panel; a main body having a nose portion and configured to receive the hood panel; and a cross car frame positioned between side surfaces of the main body and configured to detachably affix the hood panel to the cross car frame. A nose portion of the main body and interlocks the hood panel and the main body. Compressible moldings may be affixed to the hood panel to form a gasket seal between mating surfaces of the hood panel and the main body.

17 Claims, 10 Drawing Sheets

(56) References Cited

U.S. PATENT DOCUMENTS

| 2025/0002090 A1* | 1/2025 | Anderson | ............ | B62D 25/105 |
| 2025/0269798 A1* | 8/2025 | Cherak | ..................... | B60R 5/02 |

* cited by examiner

VEHICLE HOOD RETENTION SYSTEM

FIELD

Embodiments of the invention relate to a vehicle hood retention system. More specifically, embodiments of the invention relate to a hood assembly retention system for a recreational vehicle, such as a dune buggy, for example, whereby an exterior fixed front hood panel is retained by interlocking shapes with a body of the vehicle and bolted to a reinforcing cross-car frame that may also support a steering column, cantilever a windshield frame, and attach a dashboard.

BACKGROUND

In known hood retention systems, and in common practice, a vehicle hood is hinged to the body of the vehicle and releasably latched at a movable end of the hood. Often, a vehicle hood, windshield frame, dashboard, and steering column hanger are separately mounted to a vehicle chassis. These component parts either mount to each other or to adjacent portions of the main body. In certain recreational vehicles, such as dune buggies, the hood is added as part of a step-wise assembly procedure whereby various component parts are bolted together creating a labor intensive and parts intensive process. It is a novel aspect of the invention described herein to reduce the number of parts necessary for assembly and reduce time needed for maintenance and disassembly of a vehicle thereby unifying and simplifying the number of parts and making the resulting assembly/disassembly process more efficient.

Certain state of the art configurations rely on a multitude of screws along overlapping edges of a hood panel fastened to a main body of a vehicle. A windshield frame is typically attached directly to a rearmost edge of the hood panel and a steering column hanger. A dashboard is either sandwiched between the windshield frame and the hood or simply bonded permanently to the hood. This arrangement results in a cumbersome assembly/disassembly process with limited repeatability in order to service any components within the hood volume (fuel tank, wiring, instruments, switches, steering gear, etc.). Further, after only several years of use small attachment screws used in the assembly process of the vehicle squeak, loosen and need restoration.

SUMMARY

In view of the above, the present disclosure has a purpose of providing a vehicle hood and hood retention system capable of simultaneously securing the vehicle hood to a main body of the vehicle while providing for easier and faster assembly/disassembly of the vehicle, reducing the number of component parts and reducing costs in parts and labor over the lifetime of the vehicle.

In an example embodiment, the invention may be comprised of several elements of a fiberglass dune buggy kit configured in a new way with unique attachments, panels, assembly processes and serviceability. For example, a hood panel and a main body may be shaped at a nose of the vehicle allowing the hood panel to slide rearward to interlock with the body on an approximately horizontal plane that will restrain upward vertical movement. In example embodiment, a compressible molding is provided between the hood panel and main body. The compressible molding may have a deforming edge that is compressed between the hood panel and the main body. Thus, it is possible to secure a hood panel to a vehicle in a water resistant manner while reducing material and labor costs.

According to an aspect of the present disclosure, a vehicle hood panel may have a top surface and side walls extending downwardly from the top surface and a nose at a forward most position of the hood panel that overlaps and interlocks with a main body having a nose portion and configured to receive the hood panel.

According to an aspect of the present disclosure, a cross car frame may be positioned between side surfaces of the main body such that the hood panel may be detachably affixed to the cross car frame to secure the hood panel in place.

According to an aspect of the present disclosure, the vehicle hood retention system may include a first compressible molding affixed to the nose portion of the main body, such that when the hood panel overlaps and interlocks with the nose portion of the main body, the first compressible molding forms a gasket seal between an interior surface of the hood panel and a surface of the main body at corresponding mating surfaces.

According to an aspect of the present disclosure, the vehicle hood retention system may include a first compressible molding affixed to an interior surface of the hood panel, such that when the hood panel overlaps and interlocks with the nose portion of the main body, the first compressible molding forms a gasket seal between the interior surface of the hood panel and a surface of the main body at corresponding mating surfaces.

According to an aspect of the present disclosure, second compressible moldings may be affixed to parallel side surfaces of the hood panel to form a gasket seal between the hood panel and the main body at corresponding mating surfaces.

According to an aspect of the present disclosure, second compressible moldings may be affixed to surfaces of the main body at corresponding mating surfaces of the hood panel to form a gasket seal between the hood panel and the main body.

According to an aspect of the present disclosure, the hood panel and the cross car frame may have a plurality of corresponding through holes that may receive studs securing the hood panel to the cross car frame.

According to an aspect of the present disclosure, the hood panel may include flanges that receive compressible moldings. Such flanges may extend toward the main body and include bottom edge surfaces that contact side walls of the compressible moldings. The compressible moldings may further include a bulb seal that spreads out a compression load created between the hood panel and the main body.

According to an aspect of the present disclosure, the hood panel may have side walls that extend downwardly from the top surface of the hood panel and the plurality of through holes of the hood panel may be located in the side walls to receive studs thereby securing the hood panel to the cross car frame.

According to an aspect of the present disclosure, the nose of the hood panel may curve downwardly from the top surface and under the main body thereby providing an interlock between the hood panel and the main body securing the hood panel from lift.

According to an aspect of the present disclosure, a windshield may be attached to the cross car frame via the studs and bottom edge of the windshield may contact the hood panel thereby further securing the hood panel from lift.

DETAILED DESCRIPTION OF EXAMPLE EMBODIMENTS

Figure 1:
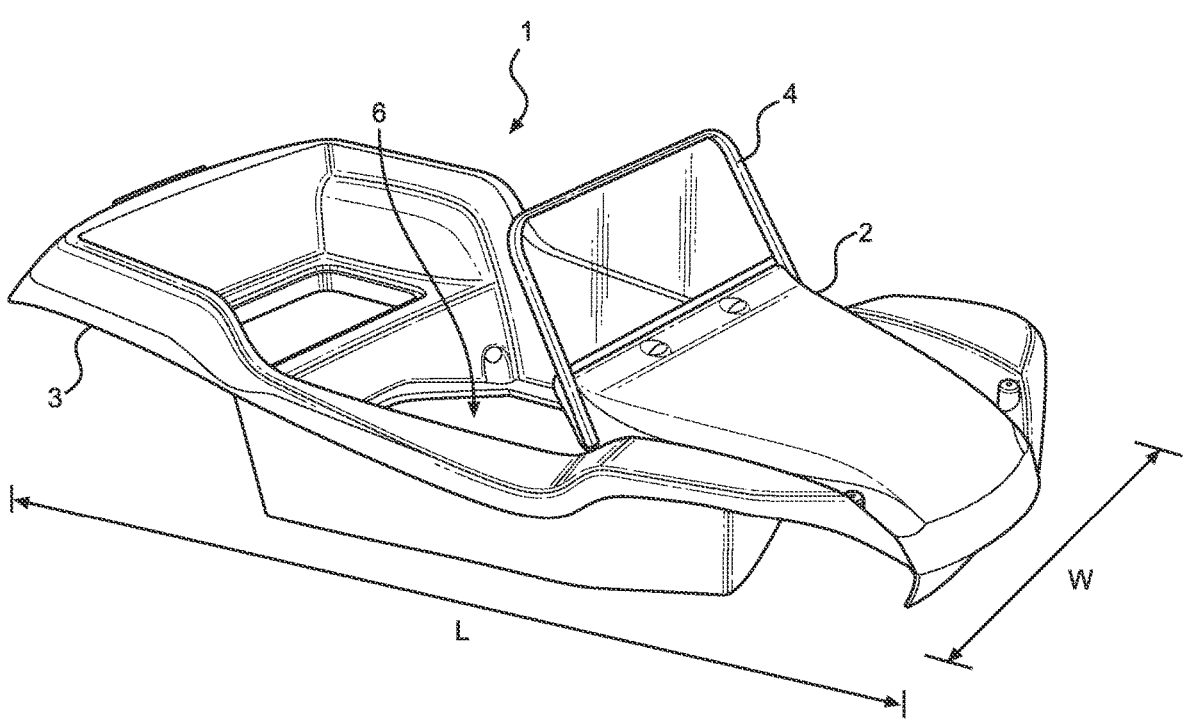
FIG. 1 shows a perspective view of an example embodiment of a vehicle main body, hood panel and windshield.

The above and other elements, features, steps, and concepts of the present disclosure will be more apparent from the following detailed description in accordance with example embodiments of the invention, which will be explained with reference to the accompanying drawings.

It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection, or communication, or coupling between functional blocks, devices, components, or other physical or functional units shown in the drawings or described herein may also be implemented by an indirect connection or coupling.

Various example embodiments will be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, etc.

Specific structural and functional details disclosed herein are merely representative for purposes of describing example embodiments of the present invention. This invention may, however, be embodied in many alternate forms and should not be construed as limited to only the embodiments set forth herein.

Use of a quantitative term or value is not limited to the exact amount recited. For example, presence of the term "about" indicates an intention to convey that the same result can be achieved by using a value that is not exactly that recited. Similarly, if an objective can be achieved by using less than all of a specified amount, it may be so indicated through use of the term "substantial" or "substantially." For example, fifty percent of a value may be considered substantial when the same result can be achieved as if 100% of a value is used. If an exact amount is required in order to achieve a result, it will be specifically stated.

At least one embodiment of the invention is directed to a hood and a retention system for the hood. FIG. 1 shows a vehicle 1 having a hood panel 2, a main body 3, a windshield 4 and a cockpit zone or passenger compartment 6.

Figure 2:
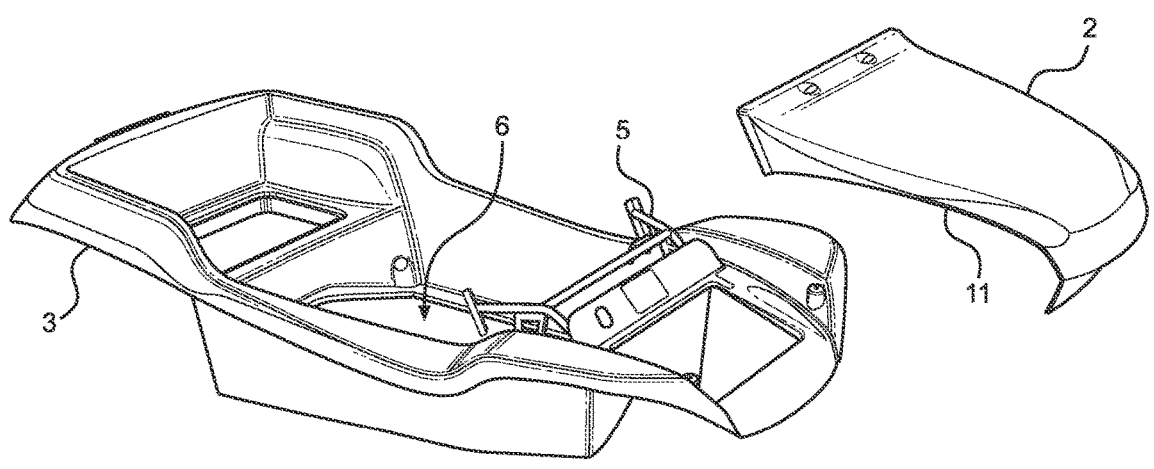
FIG. 2 shows an exploded perspective view of FIG. 1 including a vehicle main body, hood panel, wind shield and cross car frame.
Figure 10A:
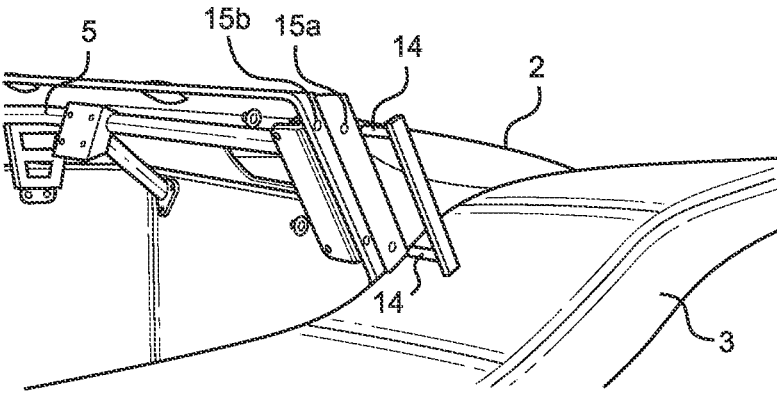
FIGS. 10*a* and 10*b* show an example system for attaching a hood panel to a vehicle main body.
Figure 10B:
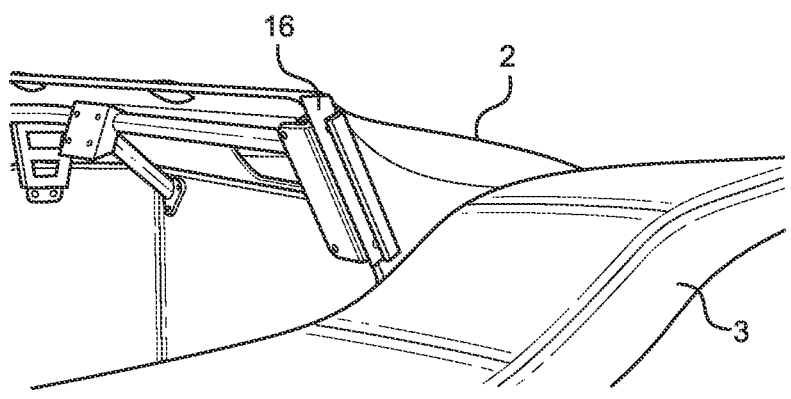
Figure 10C:
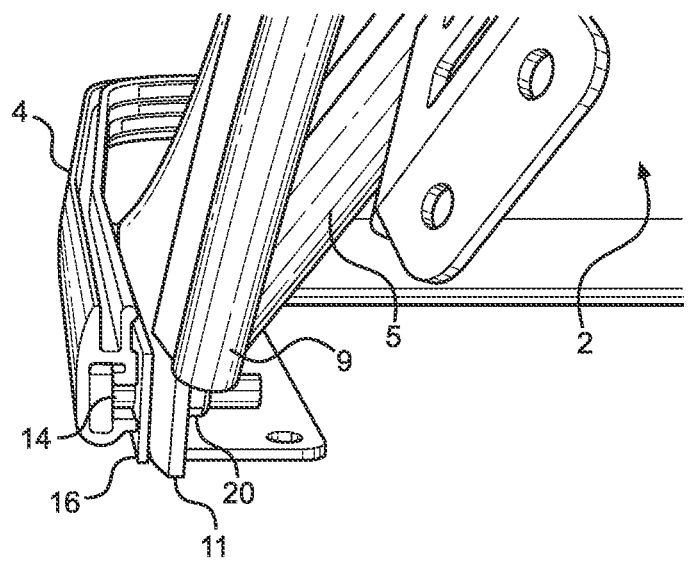
FIG. 10*c* is a view from beneath the cross car frame showing attachment points of the hood panel to the cross car frame.

As shown in FIG. 2, a cross car frame 5 is provided and is through bolted to the main body 3. In an example embodiment, the cross car frame 5 attaches to a front side portions of the cockpit zone 6 of the main body 3 by through bolts, washers and locknuts (FIG. 10a-10c).

The hood panel 2 and the main body 3 are shaped at a front end of the vehicle 1 in an interlocking fashion. The hood panel 2 and the main body 3 are shaped in a manner allowing the hood panel 2 to slide rearward toward the passenger compartment 6 of the vehicle 1 to interlock with the main body 3 on an approximately horizontal plane in a length direct L of the vehicle that will restrain upward vertical movement of the hood panel 2 when mounted on the main body 3.

Figure 3A:
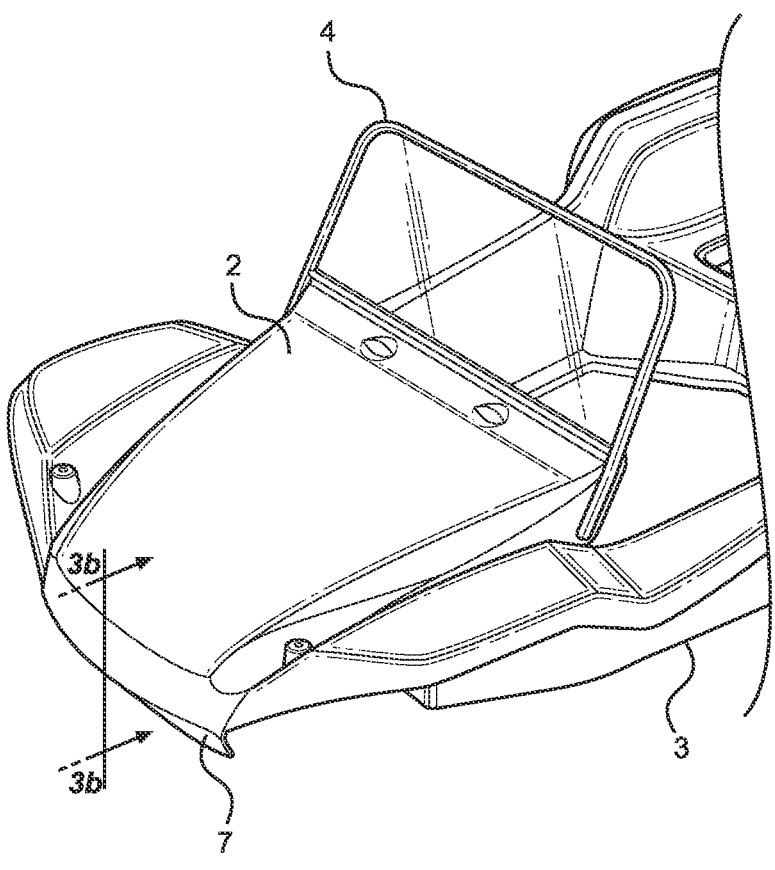
FIG. 3*a* shows a perspective view of an example embodiment of a front end of a vehicle including interfacing surfaces and FIG. 3*b* shows a cross-sectional view thereof including a compressible molding.
Figure 3B:
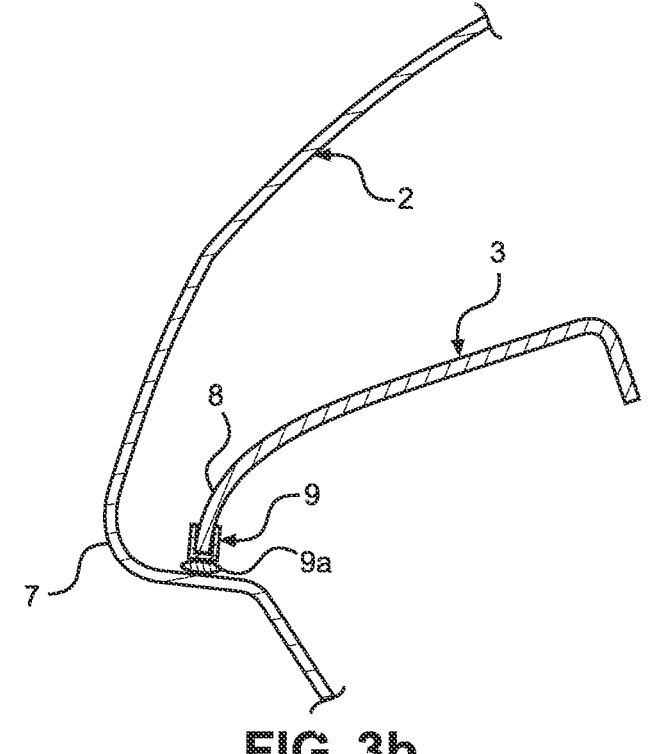

FIG. 3a shows the hood panel 2 mounted on the main body 3. FIG. 3b shows a close-up cross-sectional view taken along line 3b-3b of FIG. 3a and includes front mating surfaces of the hood panel 2 and the main body 3. A nose 7 of the hood panel 2 overlaps a corresponding nose portion 8 of the main body 3. In the example embodiment, the nose portion 8 of the main body includes and is protected by a pressed on and deformable compressible molding 9. As shown in FIG. 3b, the compressible molding 9 incorporates a bulb seal 9a that spreads out a compression load and accommodates a surface, such as a backside of the nose 7 of the hood panel 2. In an example embodiment the hood panel 2 may be a molded fiberglass part having an irregular shape. The compressible molding 9 can accommodate such an irregular shape thereby providing a seal between an interior surface portion of the nose 7 of the hood panel 2 and the nose portion 8 of the main body 3.

Figure 4:
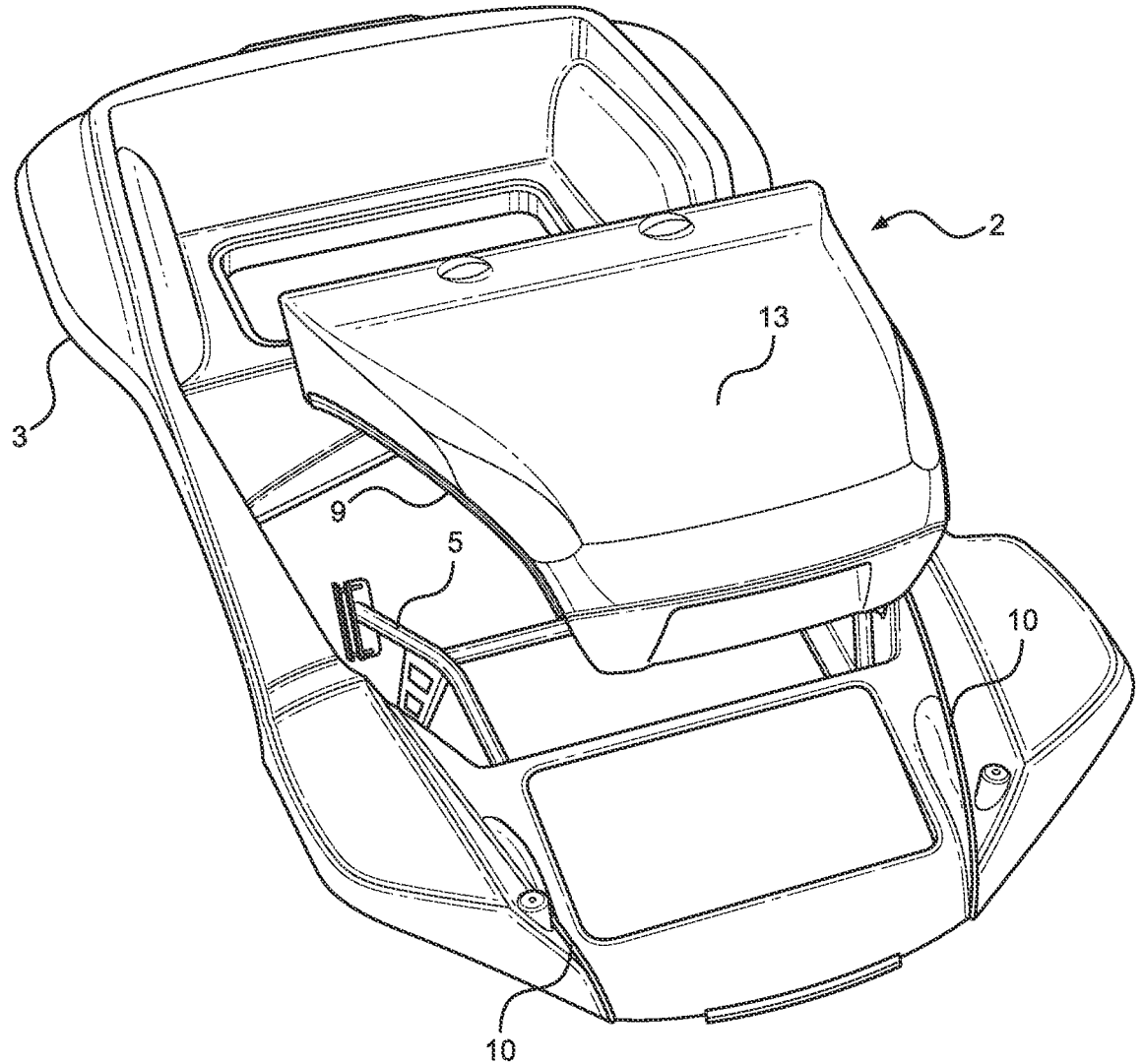
FIG. 4 shows an exploded view of an example embodiment of a vehicle main body, hood panel and cross car frame.

As shown in FIG. 4, the hood panel 2 also has compressible moldings 9 along flanges or parallel side surfaces 11 (FIG. 2). The parallel side surfaces (flanges) 11 are separated from one another in a width direction W by the top surface 13 of the hood panel 2. The compressible moldings 9 mate with corresponding surfaces 10 of the main body 3 to provide a seal between mating surfaces of the hood panel 2 and the main body 3. The corresponding surfaces 10 on the main body are substantially "L" shaped when viewed in cross-section and are configured such that the bulb seal 9a of the compressible moldings 9 directly contact a flat surface of the main body 3 to provide a gasket seal along the mating surfaces (see FIG. 6b).

Figure 5A:
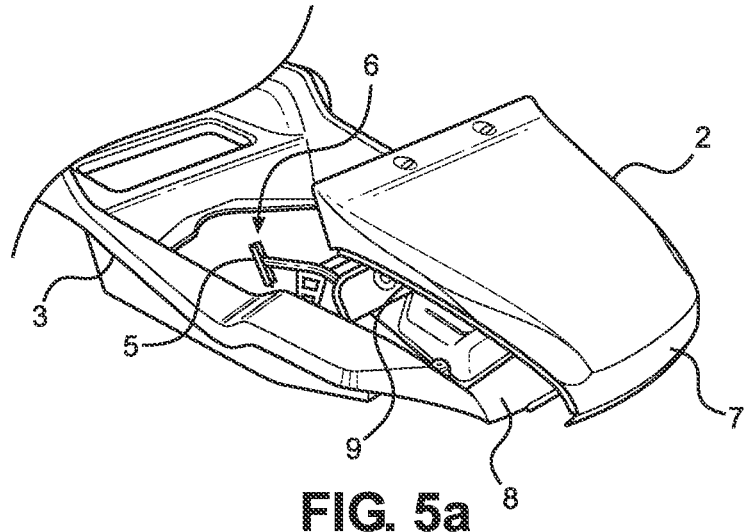
FIGS. 5*a*-5*c* show an example embodiment of a hood panel mounting position during mounting of the hood panel to a vehicle main body.
Figure 5B:
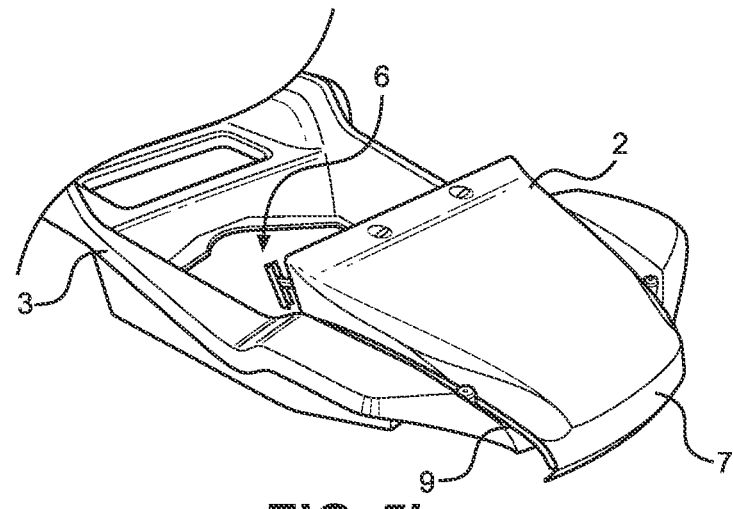
Figure 5C:
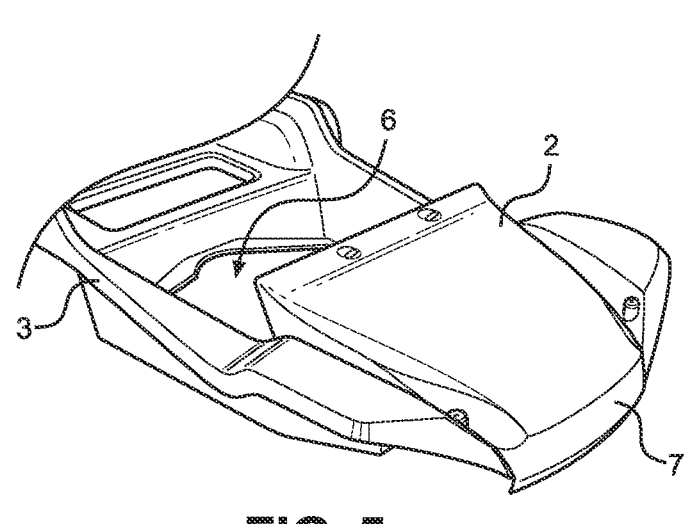

FIGS. 5a-5c show positioning and mounting of the hood panel 2 to the main body 3. FIG. 5a shows the hood panel 2 placed approximately in position at the front of the main body 3. At FIG. 5*b*, the hood panel 2 is slid rearwards toward the passenger compartment 6 in the length direction L of the vehicle 1 to interlock with the main body 3. At FIG. 5*c*, the nose 7 of the hood panel 2 overlaps with the nose portion 8 of the main body 3 at a forward-most portion of the main body 3 and prevents upward and rearward movement of the hood panel. Edges of the parallel side surfaces 11 of the hood panel 2 are protected by the compressible moldings 9. The compressible moldings 9 may incorporate the bulb seal 9*a* that spreads out a compression load created between the hood panel 2 and the main body 3 and may also accommodate an irregular surface, such as a backside or edge of a molded fiberglass part.

Figure 6A:
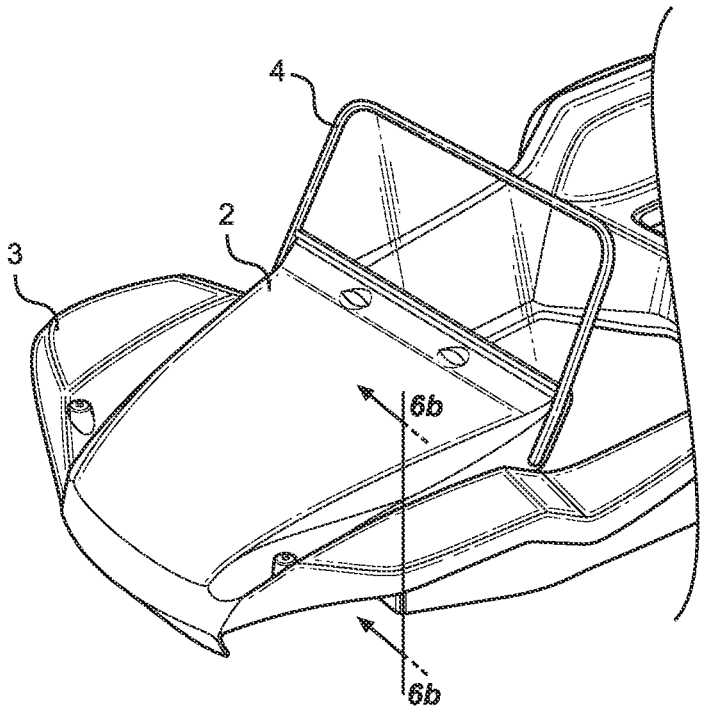
FIG. 6*a* shows a perspective view of an example embodiment of a hood panel and main body of a vehicle and FIG. 6*b* shows a cross-sectional view of mating surfaces of the hood panel and the main body thereof.
Figure 6B:
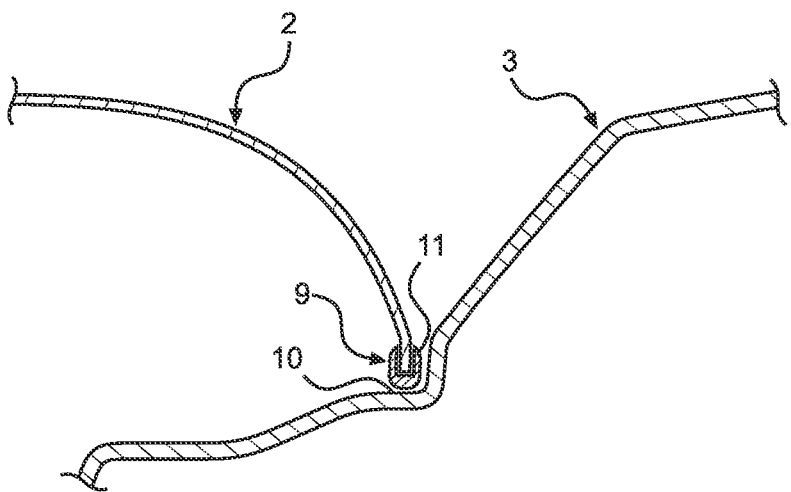

As shown in FIGS. 6*a* and 6*b*, the hood panel 2 nestles into matching surfaces 10 on the main body 3. In an example embodiment shown in FIG. 6*b* taken along lines 6*b*-6*b* of FIG. 6*a*, bottom edges of the parallel side surfaces 11 of the hood panel 2 are characterized as flanges. Along these flanges of the hood panel 2 are attached bulb edge compressible moldings 9. Upon fitting the hood panel to the main body 3, the moldings 9 nestle into respective matching surfaces 10 of the main body under compression load from the hood against the receiving forms 10 in the main body 3.

Figure 7A:
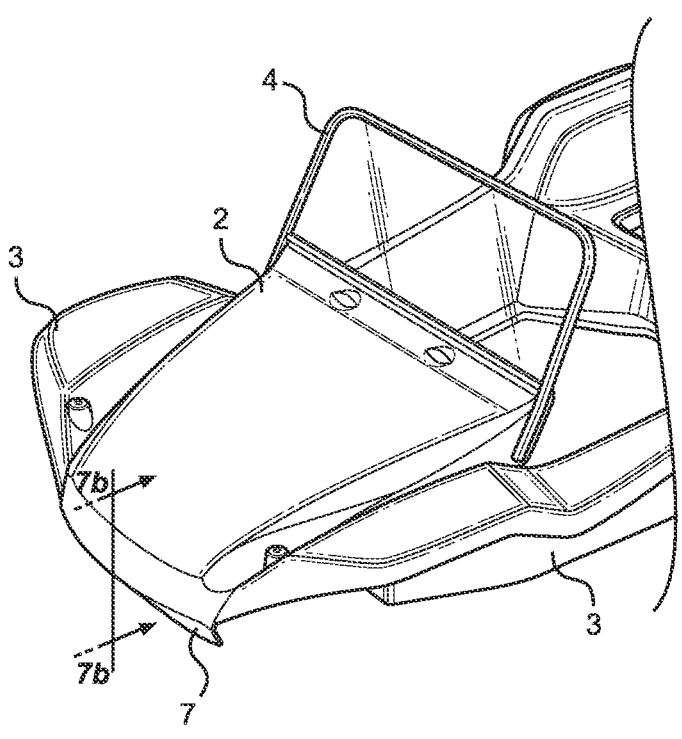
FIG. 7*a* shows a perspective view of an example embodiment of a front end of a vehicle including interfacing surfaces and FIG. 7*b* shows a cross-sectional view thereof including a compressible molding.
Figure 7B:
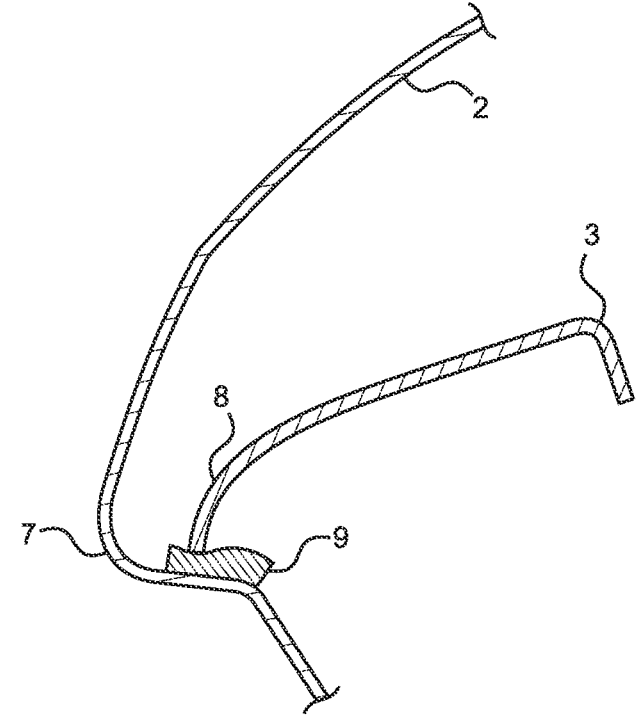

FIG. 7*a* shows the hood panel 2 mounted on the main body 3. FIG. 7*b* shows a cross-sectional view taken along the line 7*b*-7*b* of FIG. 7*a*. In the example embodiment of FIGS. 7*a* and 7*b*, a compressible molding 9 is affixed to an interior surface of a nose 7 of the hood panel 2.

FIG. 7*b* shows a close-up, cross-sectional view taken along line 7*b*-7*b* of FIG. 7*a* and includes front mating surfaces of the hood panel 2 and the main body 3. A nose 7 of the hood panel 2 overlaps a corresponding nose portion 8 of the main body 3. The nose portion 8 of the main body is protected by a deformable compressible molding 9 affixed to the interior surface of the hood panel 2. As shown in FIG. 7*b*, the compressible molding 9 spreads out a compression load and accommodates a surface, such as an edge of the nose portion 8 of the main body 3. In an example embodiment the hood panel 2 may be a molded fiberglass part having an irregular shape. The compressible molding 9 may accommodate such an irregular shape thereby providing a seal between an interior surface portion of the nose 7 of the hood panel 2 and the nose portion 8 of the main body 3.

Figure 8:
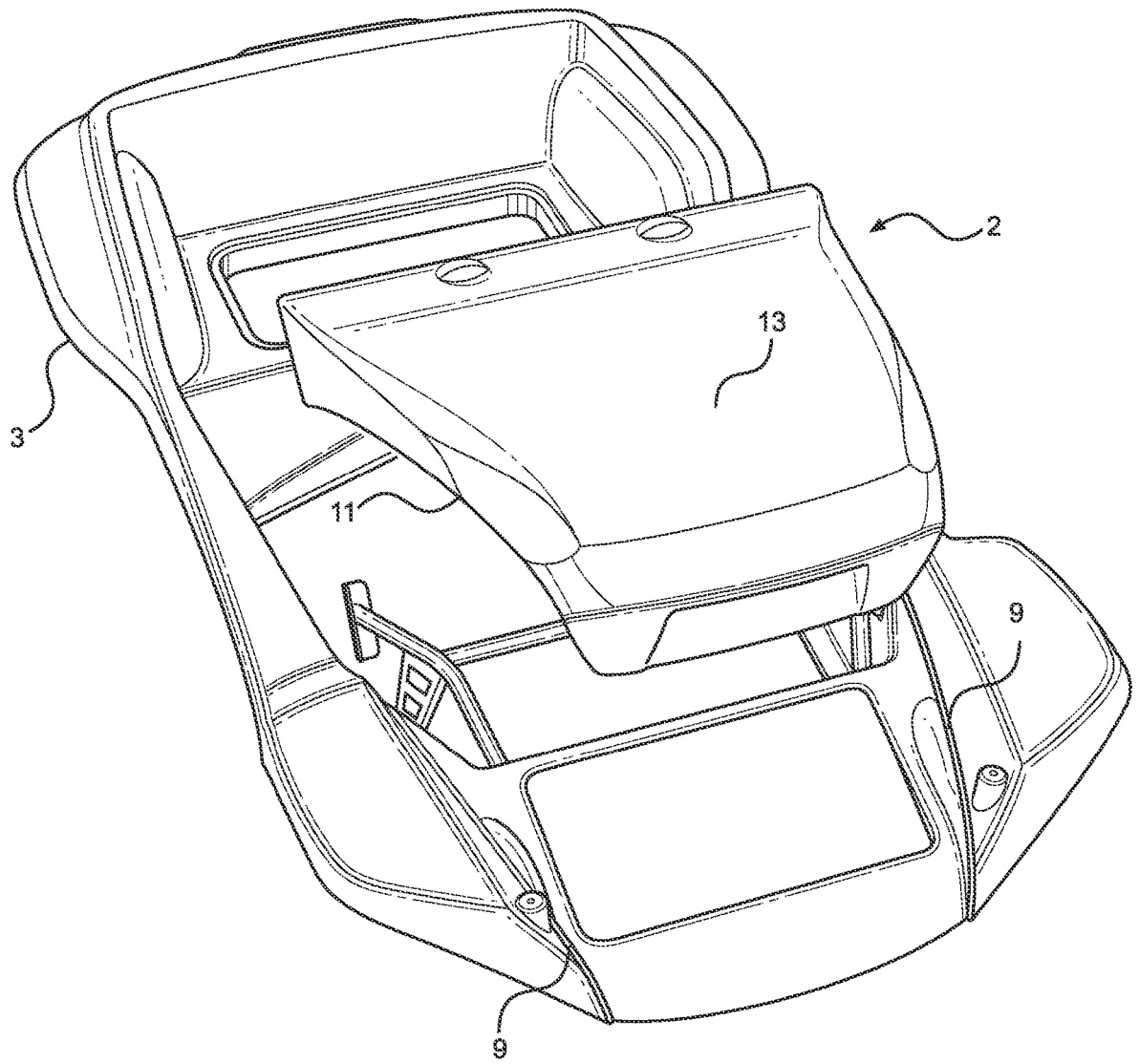
FIG. 8 shows an exploded view of an example embodiment of a vehicle main body, hood panel and cross car frame.

FIG. 8 shows an example embodiment whereby the main body 3 has compressible moldings 9 along surfaces 10 (FIG. 9*b*) arranged to mate with the flanges or parallel side surfaces 11 of the hood panel 2. The parallel side surfaces (flanges) 11 are separated from one another in a width direction W by the top surface 13 of the hood panel 2. The compressible moldings 9 disposed on the main body 3 mate with corresponding side surfaces 11 of the hood panel 2 to provide a seal between mating surfaces of the hood panel 2 and the main body 3. The surfaces 10 on the main body to which the moldings are attached are substantially "L" shaped when viewed in cross-section and are configured such that the compressible moldings 9 directly contact an edge of the flanges of the hood panel 2 to provide a gasket seal along the mating surfaces (see FIG. 9*b*).

Figure 9A:
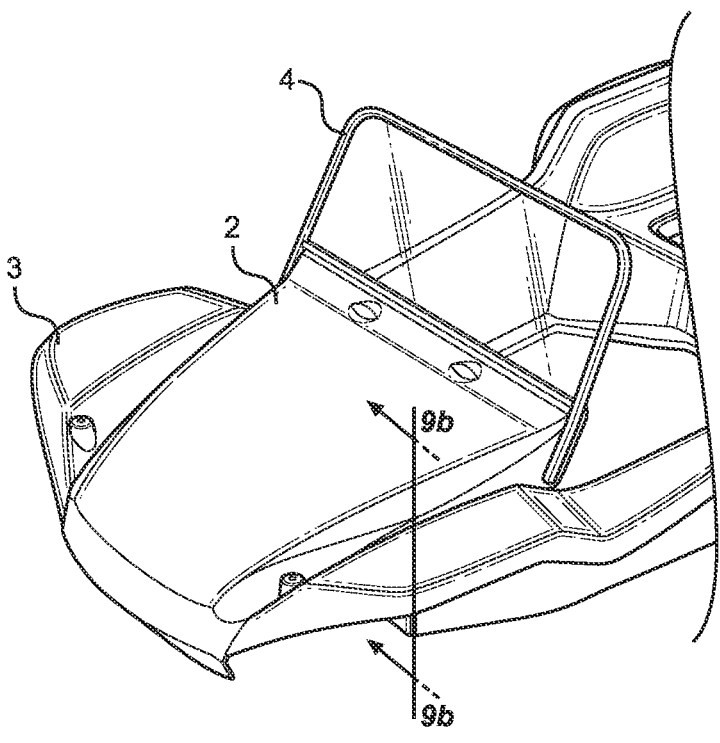
FIG. 9*a* shows a perspective view of an example embodiment of a hood panel and main body of a vehicle and FIG. 9*b* shows a cross-sectional view of mating surfaces of the hood panel and the main body thereof including a compressible molding.
Figure 9B:
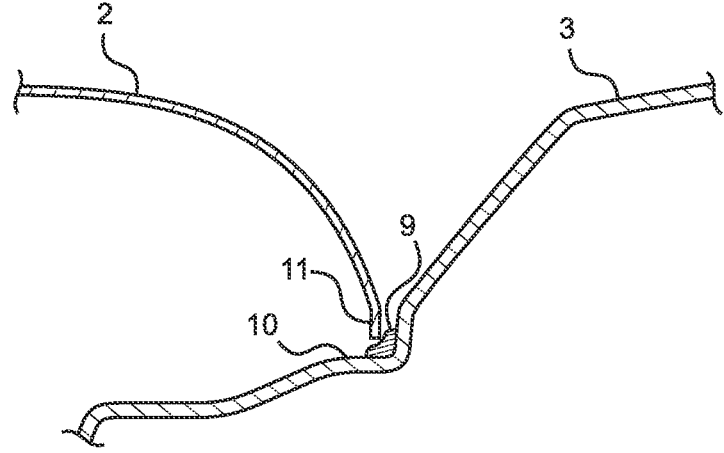

As shown in the example embodiment of FIGS. 9*a* and 9*b*, the hood panel 2 nestles into matching surfaces 10 of the compressible moldings 9 provided on the main body 3. In the example embodiment shown in FIG. 9*b* taken along lines 9*b*-9*b* of FIG. 9*a*, bottom edges of the parallel side surfaces 11 of the hood panel 2 are characterized as flanges. Along these flanges of the hood panel 2 are received on the compressible moldings 9 attached to the main body 3 under compression load from the hood against the receiving forms 10 in the main body 3.

In an example embodiment shown in FIGS. 10*a*-10*c*, a pair of studs 14 may be fitted through holes 15*a* in a gasket 16 and matching holes 15*b* in the side walls 12 of the hood panel into corresponding holes in the cross-car frame 5. In an example embodiment, a pair of washers 18 and nuts 20 are affixed to the studs 14 to keep them from moving (FIG. 11*b*). The studs 14 may later be lined up so that they will slide into the corresponding track on a frame of the windshield 4 (FIGS. 11*a*-11*b*).

The hood panel 2, which is through bolted to the main body 3 as described and interfaces with the nose portion 8 of the main body, is provided with rearward and downward forces that anchor the hood panel 2 to the main body 3.

Figure 11A:
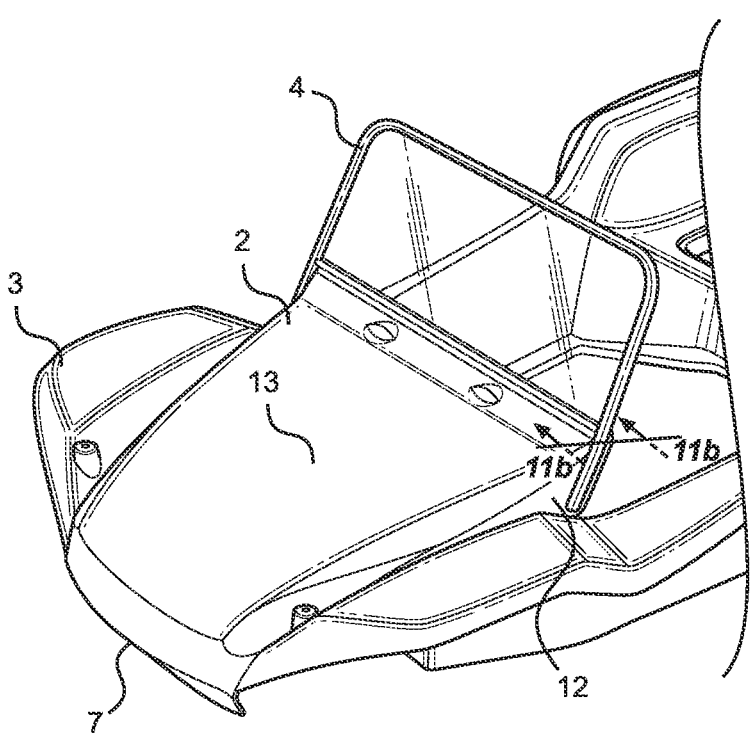
FIG. 11*a* shows a perspective view of an example embodiment of a hood panel and main body of a vehicle and FIG. 11*b* shows an example mounting system for fixing the hood panel to the vehicle main body.
Figure 11B:
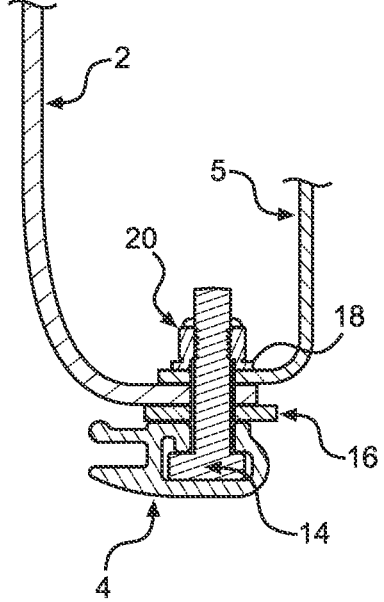

In an example embodiment shown in FIGS. 11*a*-11*b*, once the hood panel 2 is properly fitted to the main body 3, the hood panel 2 is bolted to the cross car frame 5 at side walls 12 of the hood panel 2 that extend downwardly from a top surface 13 of the hood panel. FIG. 11*b* shows a cross-sectional view taken along line 11*b*-11*b* of FIG. 11*a* of an example attachment system. In the example embodiment, the wind shield frame 4 is slid downwardly over the studs 14 such that the gasket 16 is sandwiched between the studs 14 and the hood. The nuts 20 are then further tightened onto studs 14 to secure wind shield 4 and the hood panel 2 to the cross car frame 5.

According to the claimed invention, through the incorporation of the interlock between the hood panel and the main body, the claimed hood retention system negates the previously known cumbersome assembly process and greatly reduces the number of component parts required at assembly.

Although the invention has been illustrated in greater detail using the example embodiments, the invention is not limited by the disclosed examples, and a person skilled in the art can derive other variations therefrom without departing from the scope of protection of the invention.

What is claimed is:

1. A vehicle hood retention system, comprising,
a hood panel having an external appearance defined by a top surface, side walls extending downwardly from the top surface and a nose at a forward most position of the hood panel;
a main body having a nose portion and configured to receive the hood panel;
a cross car frame positioned between side surfaces of the main body and configured to detachably affix the hood panel to the cross car frame; and
wherein the nose of the hood panel curves downwardly from the top surface and under the main body.

2. The vehicle hood retention system of claim 1, further comprising
a first compressible molding affixed to the nose portion of the main body,
wherein the hood panel is configured to overlap the nose portion of the main body and interlock the hood panel and the main body, and the first compressible molding is configured to form a gasket seal between an interior surface of the hood panel and a surface of the main body at corresponding mating surfaces.

3. The vehicle hood retention system of claim 1, further comprising
a first compressible molding affixed to an interior surface of the hood panel, wherein the hood panel is configured to overlap the nose portion of the main body and interlock the hood panel and the main body, and the first compressible molding is configured to form a gasket seal between the interior surface of the hood panel and a surface of the main body at corresponding mating surfaces.

4. The vehicle hood retention system of claim 1, wherein the hood panel further includes parallel side surfaces separated from each other in a width direction of the vehicle by the top surface of the hood panel.

5. The vehicle hood retention system of claim 1, wherein the hood panel and the cross car frame have a plurality of corresponding through holes configured to receive respective studs securing the hood panel to the cross car frame.

6. The vehicle hood retention system of claim 2, wherein hood panel further comprises flanges configured to receive respective second compressible moldings, the flanges extending toward the main body and including bottom edge surfaces that contact the second compressible moldings, and wherein the first compressible molding and second compressible moldings have a bulb seal that spreads out a compression load created between the hood panel and the main body.

7. The vehicle hood retention system of claim 4, further comprising
second compressible moldings affixed to the parallel side surfaces of the hood panel and configured to form a gasket seal between the hood panel and the main body at corresponding mating surfaces.

8. The vehicle hood retention system of claim 4, further comprising
second compressible moldings affixed to parallel surfaces of the main body at corresponding mating surfaces of the hood panel and configured to form a gasket seal between the hood panel and the main body at the corresponding mating surfaces.

9. The vehicle hood retention system of claim 5, wherein the plurality of through holes of the hood panel are located in the side walls.

10. The vehicle hood retention system of claim 5, further comprising
a windshield, wherein the windshield is attached to the cross car frame via the studs and bottom edge of the windshield contacts the hood panel.

11. A method of assembling a vehicle hood to a main body of a vehicle, comprising:
providing a hood panel having a top surface and side walls extending downwardly from the top surface and a nose at a forward most position of the hood panel, a main body having a nose portion and configured to receive the hood panel, and a cross car frame positioned between side surfaces of the main body and configured to detachably affix the hood panel to the cross car frame;
positioning the hood panel at a front of the main body and sliding the hood panel rearward to interlock with the main body on an approximately horizontal plane;
fitting studs through holes in the hood panel and into corresponding holes in the cross-car frame; and threading a pair of washers and nuts to the studs.

12. The method of claim 11, further comprising
applying a first compressible molding to the nose portion of the main body to form a gasket seal between an interior surface of the hood panel and a surface of the main body at corresponding mating surfaces.

13. The method of claim 11, further comprising
applying second compressible moldings to parallel side surfaces of the hood panel to form a gasket seal between the hood panel and the main body at corresponding mating surfaces.

14. The method of claim 11, further comprising
applying a first compressible molding to an interior surface of the hood panel to form a gasket seal between the interior surface of the hood panel and a surface of the main body at corresponding mating surfaces.

15. The method of claim 11, further comprising
applying second compressible moldings to side surfaces of the main body to form a gasket seal between the hood panel and the main body at corresponding mating surfaces.

16. The method of claim 11, further comprising
fitting the studs through holes in the side walls that extend downwardly from the top surface of the hood panel.

17. The method of claim 11, further comprising
interlocking the nose of the hood panel to the nose portion of the main body by fitting an interior surface of the nose beneath the nose portion of the main body.

* * * * *